US007996689B2

(12) United States Patent
Li (10) Patent No.: US 7,996,689 B2
(45) Date of Patent: *Aug. 9, 2011

(54) SYSTEM AND METHOD FOR POWER CONTROL FOR ASIC DEVICE

(75) Inventor: Henry Shi Li, Shanghai (CN)

(73) Assignee: Semiconductor Manufacturing International (Shanghai) Corporation, Shanghai (CN)

( * ) Notice: Subject to any disclaimer, the term of this patent is extended or adjusted under 35 U.S.C. 154(b) by 643 days.

This patent is subject to a terminal disclaimer.

(21) Appl. No.: 11/692,902

(22) Filed: Mar. 28, 2007

(65) Prior Publication Data

US 2007/0288772 A1  Dec. 13, 2007

Related U.S. Application Data

(63) Continuation-in-part of application No. 11/624,691, filed on Jan. 18, 2007, now Pat. No. 7,814,344.

(30) Foreign Application Priority Data

Jun. 12, 2006 (CN) .......................... 2006 1 0027590
Sep. 30, 2006 (CN) .......................... 2006 1 0116852

(51) Int. Cl.
*G06F 1/10* (2006.01)
*G06F 1/26* (2006.01)

(52) U.S. Cl. ........ 713/300; 713/100; 713/320; 327/143; 327/530

(58) Field of Classification Search .................. 713/100, 713/300, 320; 327/143, 530
See application file for complete search history.

(56) References Cited

U.S. PATENT DOCUMENTS

| | | | |
|---|---|---|---|
| 5,367,638 A | 11/1994 | Niessen et al. | |
| 5,452,401 A | 9/1995 | Lin | |
| 6,195,755 B1 | 2/2001 | Webster et al. | |
| 6,307,281 B1 * | 10/2001 | Houston | 307/31 |
| 6,647,502 B1 | 11/2003 | Ohmori | |
| 6,865,653 B2 | 3/2005 | Zaccarin et al. | |
| 7,437,582 B1 * | 10/2008 | Parlour | 713/320 |
| 7,814,344 B2 | 10/2010 | Li | |
| 2005/0044448 A1 * | 2/2005 | Verdun | 714/22 |
| 2007/0226462 A1 | 9/2007 | Scott et al. | |
| 2007/0285137 A1 * | 12/2007 | Li | 327/143 |

OTHER PUBLICATIONS

Notice of Allowance for U.S. Appl. No. 11/624,691, mailed on Jul. 6, 2010, 4 pages (Copy available via PAIR).
Non-Final Office Action for U.S. Appl. No. 11/624,691, mailed on Jan. 25, 2010, 18 pages (Copy available via PAIR).

* cited by examiner

*Primary Examiner* — Abdelmoniem Elamin
(74) *Attorney, Agent, or Firm* — Kilpatrick Townsend and Stockton LLP (57) ABSTRACT

A system and method for power control for ASIC device is disclosed. According to an embodiment, the present invention provides a system for adjusting power consumption of an application specific integrated circuit (ASIC) device. The system includes a first buffer that is configured to receive and store data. For example, the first buffer can be characterized by a first buffer level. The method also includes a controller configured to generate a control signal. According to an embodiment, the controller is coupled to the first buffer. The system additionally includes a power supply component, which is configured to receive the control signal and to provide at least at a first voltage and a second voltage. For example, the first voltage and the second voltage are different. The system further includes a processing unit coupled to the first buffer, the processing unit further being configured to receive the data from the first buffer and to process the data, the processing unit being electrically coupled to the power supply component.

23 Claims, 7 Drawing Sheets

SYSTEM AND METHOD FOR POWER CONTROL FOR ASIC DEVICE

CROSS-REFERENCES TO RELATED APPLICATIONS

This application claims priority to Chinese Patent Application No. 200610116852.2, filed Sep. 30, 2006, incorporated by reference herein for all purposes. This application is also a continuation-in-part of U.S. patent Ser. No. 11/624,691, filed on Jan. 18, 2007 now U.S. Pat. No. 7,814,344 which claims priority to Chinese Patent Application No. 200610027590.2; filed Jun. 12, 2006 by inventor Henry Shi Li, commonly assigned, incorporated by reference herein for all purposes.

BACKGROUND OF THE INVENTION

The present invention is directed to integrated circuits. More particularly, the invention provides a power saving system and method for application specific integrated circuit (ASIC) devices. Merely by way of example, the invention has been applied to very large scale integration (VLSI) chips that include ASIC circuits. But it would be recognized that the invention has a much broader range of applicability.

Integrated circuits or "ICs" have evolved from a handful of interconnected devices fabricated on a single chip of silicon to millions of devices. Current ICs provide performance and complexity far beyond what was originally imagined. In order to achieve improvements in complexity and circuit density (i.e., the number of devices capable of being packed onto a given chip area), the size of the smallest device feature, also known as the device "geometry", has become smaller with each generation of ICs. Semiconductor devices are now being fabricated with features less than a quarter of a micron across.

Increasing circuit density has not only improved the complexity and performance of ICs but has also provided lower cost parts to the consumer. An IC fabrication facility can cost hundreds of millions, or even billions, of dollars. Each fabrication facility will have a certain throughput of wafers, and each wafer will have a certain number of ICs on it. Therefore, by making the individual devices of an IC smaller, more devices may be fabricated on each wafer, thus increasing the output of the fabrication facility. Making devices smaller is very challenging, as a given process, device layout, and/or system design often work down to only a certain feature size.

Integrated circuits have a variety of applications. For example, ASIC is a type of chip that has been produced for particular application. For example, ASIC have been designed and use for cellular telephones. Generally, feature, size, and power consumption of ASIC devices important characteristics. Excessive power consumption is typically an undesirable characteristic. Excessive power consumption not only causes high energy costs, but also can generate a significant amount of heat that adversely affects device performance and even damages device components if proper protective measures are not adopted.

In the past, various techniques have been used to reduce power consumption for ASIC circuits. For example, dynamic variable power-supply (DVP) system has been a conventional techniques used to reduce power consumption. Unfortunately, conventional techniques such as the DVP system are often inadequate.

From the above, it is desirable to have an improved technique for power control of ASIC devices.

BRIEF SUMMARY OF THE INVENTION

The present invention is directed to integrated circuits. More particularly, the invention provides a power saving system and method for application specific integrated circuit (ASIC) devices. Merely by way of example, the invention has been applied to very large scale integration (VLSI) chips that include ASIC circuits. But it would be recognized that the invention has a much broader range of applicability.

According to an embodiment, the present invention provides a system for adjusting power consumption of an application specific integrated circuit (ASIC) device. The system includes a first buffer that is configured to receive and store data. For example, the first buffer can be characterized by a first buffer level. The method also includes a controller configured to generate a control signal. According to an embodiment, the controller is coupled to the first buffer. The system additionally includes a power supply component, which is configured to receive the control signal and to provide at least at a first voltage and a second voltage. For example, the first voltage and the second voltage are different. The system further includes a processing unit coupled to the first buffer, the processing unit further being configured to receive the data from the first buffer and to process the data, the processing unit being electrically coupled to the power supply component, the processing unit being capable of operating at the first voltage and the second voltage. In addition, the system includes a second buffer that is coupled to the processing unit. In an embodiment, the second buffer is configured to receive and store the processed data. The controller is further configured to process information associated at least with the first buffer level and a first predetermined buffer level. If the first buffer level is determined to be higher than the first predetermined buffer level, the control signal indicates that the first voltage to be provided by the power supply component. If the first buffer level is determined to be not higher than a first predetermined buffer level, the control signal indicates that the second voltage is to be provided by the power supply component. The power supply component provides an output supply voltage based on the control signal, the output supply voltage being either the first voltage or the second voltage.

According to another embodiment, the present invention provides a method for adjusting power consumption of an ASIC device. The method includes a step for receiving and storing data at a first buffer, which can be characterized by a first condition (e.g., buffer fullness, data rate, etc.). The method also includes a step for generating a control signal that is associated with the first condition. The method additionally includes a step for selecting a voltage source based on the control signal. For example, the voltage source is associated with a predetermined voltage level. Furthermore, the method includes a step for processing the data at the predetermined voltage level. The method additionally includes a step for outputting the processed data. The generating a control signal further comprises processing information associated with the first condition and a predetermined condition. If the first condition is determined to be higher than the predetermined condition, the control signal indicates that the voltage source to be a first voltage source. If the first condition is determined to be not higher than the predetermined condition, the control signal indicates the voltage source to be a second voltage source. The first voltage source operates at a first voltage level, the second voltage source operates at a second voltage level. For example, the first voltage level is higher than the second voltage level.

According to yet another embodiment, the present invention provides a system for adjusting power consumption of an ASIC device. The system includes a first buffer component that is configured to receive and store data. Among other things, the first buffer can be characterized by a first condition. The system also includes a controller that is configured to generate a control signal. The first control is coupled to the first buffer. The system further includes a power supply component that is configured to receive the control signal from the controller. The power supply component includes a first power source and a second power source. For example, the first voltage source is configured to provide power at a first power level. The second voltage source is configured to provide power at a second power level. The system additionally includes a processing unit that is configured to process the data stored at the first buffer component. The processing unit is electrically coupled to the power supply component. For example, the processing unit is capable of operating at the first power level and the second power level. The system further includes a second buffer being coupled to the processing unit. The second buffer is configured to receive and store the processed data from the processing unit. The controller is further configured to process information associated at least with the first condition, a first predetermine condition, and a second predetermined condition. If the first condition is determined to satisfy the first predetermined condition, the control signal indicates that the first power source is to be used. If the second condition is determined to satisfy the second predetermined condition, the control signal indicates that the first power source is to be used. The power supply component is further configured to supply power using the first power source if the control signal indicates that the first power source is to be used, and to operate with the second power source if the control signal indicates that the second power source is to be used. The first power source is associated with a first power consumption level. The second power source is associated with a second power consumption level, the second power consumption level being different from the first power consumption level. The first predetermined condition is different from the second predetermined condition.

It is to be appreciated that the present invention provides an improved system and method for providing power for ASIC devices. According to certain embodiments, the present invention reduces power consumption and improves power efficiency for ASIC devices. Depending upon application, the present invention also provides better flexibility for power control and implementation.

The present invention provides various advantages. Some embodiments of the present invention provide a system and method for reducing power consumption. Depending upon application, the present lowers power consumption and prolongs battery usage for portable devices that utilize ASIC devices. For certain applications, the present invention lowers heat dissipation by adjusting power used by ASIC devices. For example, low power is used when ASIC devices is not busy. Certain embodiments of the present invention utilize a controller to provide control signal for adjusting the operation power of ASIC devices. Various embodiments of the present invention are compatible with existing system.

Depending upon embodiment, one or more of these benefits may be achieved. These benefits and various additional objects, features and advantages of the present invention can be fully appreciated with reference to the detailed description and accompanying drawings that follow.

DETAILED DESCRIPTION OF THE INVENTION

The present invention is directed to integrated circuits. More particularly, the invention provides a power saving system and method for application specific integrated circuit (ASIC) devices. Merely by way of example, the invention has been applied to very large scale integration (VLSI) chips that include ASIC circuits. But it would be recognized that the invention has a much broader range of applicability.

In the past, various techniques have been used to reduce power consumption for ASIC circuits. For example, dynamic variable power-supply (DVP) system has been a conventional techniques used to reduce power consumption. Unfortunately, conventional techniques such as the DVP system are often inadequate.

Figure 1:
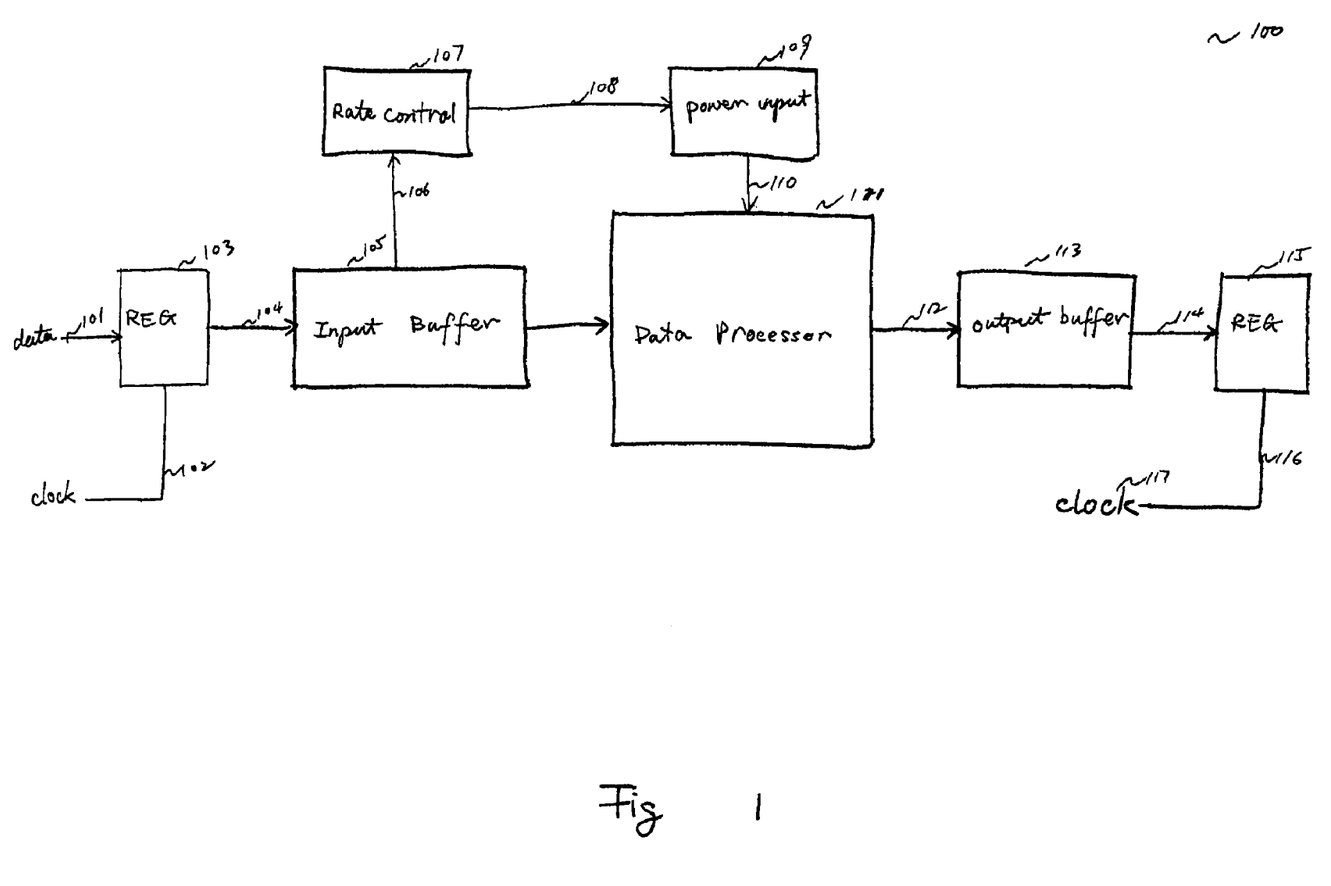
FIG. 1 is a simplified diagram illustrating a conventional power-supply system for ASIC devices.

FIG. 1 is a simplified diagram illustrating a conventional power-supply system for ASIC devices. This diagram is merely an example, which should not unduly limit the scope of the claims. One of ordinary skill in the art would recognize many variations, alternatives, and modifications. A system 100 includes the following components:
1. data source 101;
2. register 103;
3. clock 102;
4. input buffer 105;
5. rate control 107;
6. power input 108;
7. data processor 111;
8. output buffer 113;
9. register 115; and
10. clock 117

Typically, the data comes in from the data source 101. The register 103 receives data in a synchronous fashion based on the signals from the clock 102. The received data that is stored at the register 103 is then transferred to the input buffer 105. The input buffer 105 is connected to the rate control 107. The rate control 107 is connected to the power input 109. For example, the power input 109 is a DC power source or DC power converter. The rate control 109 determines how much power the power input 108 delivers to the data processor 111. For example, the rate control 109 determines the power level for the power input 108 based on the amount of data that is stored in the input buffer 105. The power input 109 delivers power to the data processor 111 accordingly. The data process 111 processes data and then sends data to the output buffer 113. The output buffer 113 transfers data to the register 115. The register 115 output data in accordance with the clock 117 input.

While the power scheme in the system 100 adjusts power according to data dependencies during operation to lower power consumption, such scheme is often adequate. For example, the power requirement and consumption is typically low when data in the buffer 105 is low, and vice versa. But because of the difficulty associated with integrating inductors into an ASIC chip, additional power consumption is often introduced by the power input 109. Moreover, the system 100 generally has poor response time for the adjusting power output level, and such response time often leads to poor energy-saving performance.

It is therefore desirable to have an improved system and method to provide power for ASIC devices. It is to be appreciated that certain embodiments of the present invention provides an improved system and method that provide power for ASIC devices.

Figure 2:
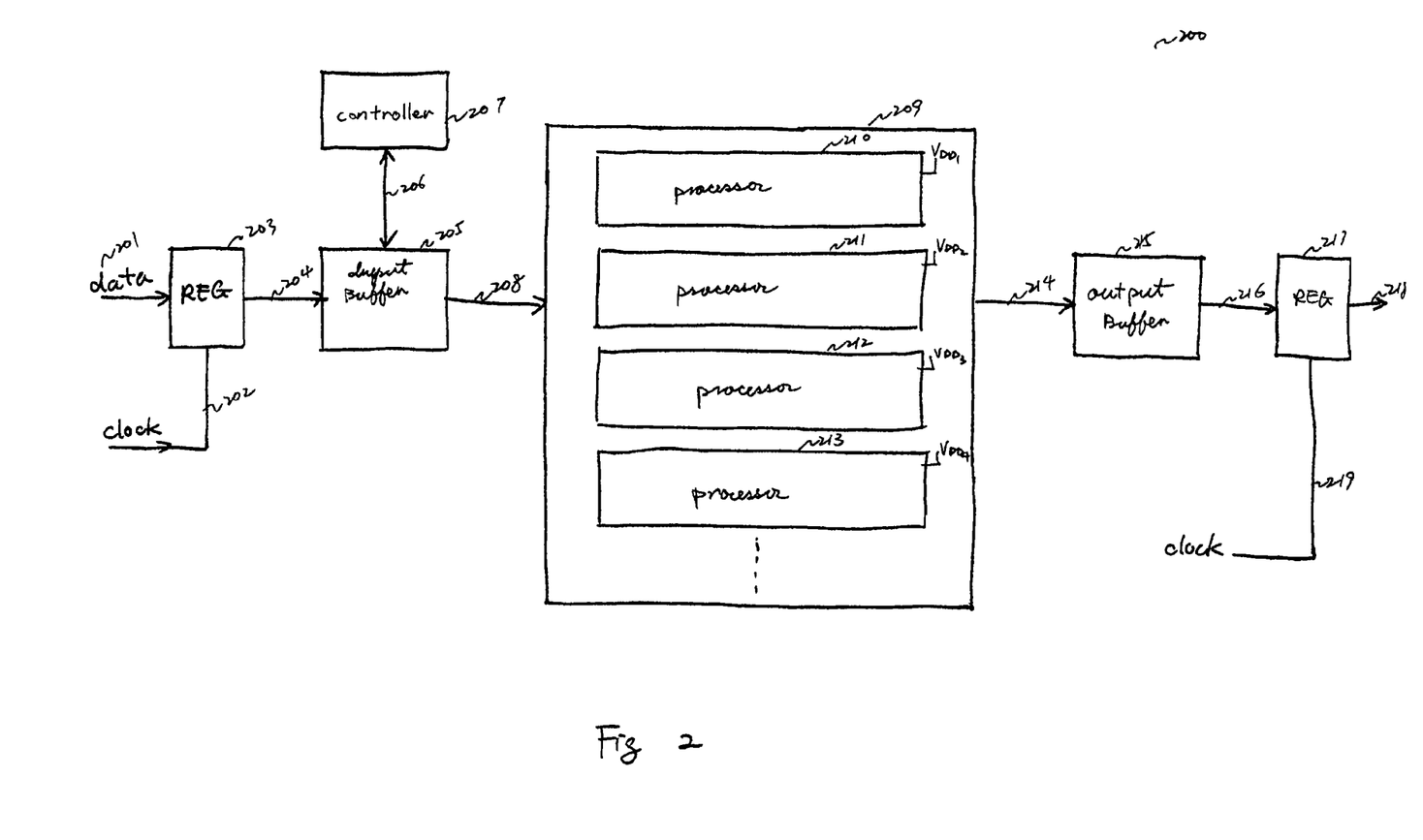
FIG. 2 is a simplified diagram illustrating a power system for ASIC devices according to an embodiment of the present invention.

FIG. 2 is a simplified diagram illustrating a power system for ASIC devices according to an embodiment of the present invention. This diagram is merely an example, which should not unduly limit the scope of the claims. One of ordinary skill in the art would recognize many variations, alternatives, and modifications. The system 200 includes the following components:

1. data input 201;
2. clock 202;
3. register 203;
4. input buffer 205;
5. controller 207;
6. processor 209;
7. output buffer 215;
8. register 217; and
9. clock 219.

Although the above has been shown using a selected group of components for the system 200, there can be many alternatives, modifications, and variations. For example, some of the components may be expanded and/or combined. For example, the controller 207 and the processor 209 are combined according to an embodiment of the present invention. As another example, the processor 209 includes only one processor that is able to select utilize multiple power level. Other components may be inserted to those noted above. Depending upon the embodiment, the arrangement of components may be interchanged with other replaced. Further details of these components are found throughout the present specification and more particular below.

The register 203 is configured to receive data from the data source 201. According to an embodiment, the register 203 receives data from the data source in accordance with clock input. For example, the clock 202 is a sinusoidal wave with a predetermine frequency and the register 203 receives data segments at the peak of each sinusoidal wave.

The register 203 is connected to the input buffer 205, which is configured to receive from the register 203 and store data. For example, the input buffer 205 includes random access memory (RAM) to store data.

The input buffer 205 is also connected to a controller 207. The controller 207 is configured to perform a variety of functions. According to an embodiment of the present invention, the controller 207 is configured to generate a control signal that is used to determine the power level to be used to process data. For example, the controller 207 determines the fullness of the input buffer 205. Based on the fullness of the input buffer 205, the controller 207 generate control signal indicating what power level is to be used. For example, the controller 207 generates a signal indicating that high power level is to be used if the input buffer 205 is full. On the other hand, the controller 207 generates a signal indicating that low power level is to be used if the input buffer 205 is empty. Depending upon applications, more than more type of power level signals can be used. For example, the control signal may be used to indicate more than three power levels based on buffer level. Usually if chip area is a concern, two power-levels are enough to reduce power consumption significantly for many applications.

It is to be appreciated that the controller 207, according to certain embodiments of the present invention, is flexible. For example, the controller 207 is configured to determine power output level based on certain conditions. For example, the controller 207 determines the data transfer rates and uses the data transfer rate as a condition for determining the power level output. The controller 207 determines that a high power level is needed when the data transfer rate is higher than a predetermined rate. As another example, the controller 207 determines the type of data that is stored at the input buffer 205. For certain types of data (e.g., multimedia data) that requires more processing power, the controller 207 generates a control signal indicating that a high power level is needed for the purpose of processing data.

Depending upon applications, the controller 207 can be configured to generate control signals for a variety of applications. Optimized power requirement may be stored in a data structure. For example, the controller 207 stores a look up table with optimized power output level as shown in Table 1.

TABLE 1

| Data Type | Data Rate | Power requirement |
|---|---|---|
| Voice | 32 kbits/s | 0.5 |
| Interactive data | 1-100 kbit/s | 0.1 |
| Bulk data | 1-10 Mbits/s | 1-0.1 |
| Standard quality video | 1.5-15 Mbit/s | 0.5-0.33 |
| High definition TV | 15-150 Mbit/s | 1-0.5 |
| Video telephony | 0.2-2 Mbit/s | 0.2 |

Table 1 is only an example and should not unduly limit the scope of claims. For example, the data rate and power requirement vary. Generally, video data rates vary depending upon coding methods. For example, video data rates vary greatly if variable bit rate method is used for encoding the video. According, the power consumption level would change accordingly. It is to be appreciated that various embodiments of the present invention allows fast response time to dynamically determine power to be used for processing data.

The controller 207 is connected to the processor 209. The controller 207 is configured to send the control signal to the processor 209. The processor 209 selects what power source should be used in response to the control signal received from the controller. According to an embodiment, the processor 209 includes two or more power sources that are electrically coupled to processor to provide power. For example, each of the power sources is a circuit that uses a different supply voltage. As illustrated in FIG. 2, the processor 209 includes processor 210, processor 211, processor 212, and processor 213. Each processor is coupled to a different power source. According to an embodiment, the processor 210 is coupled to a power source with less than 0.2 volt of power while the processor 211 is coupled to a power source that is capable of delivering more than 0.5 volt of power. For example, during operation, the processor 209 selects the processor 210 to process data if the received control signal indicates that low power level is to be used; the processor 209 selects the processor 211 to process data if the received control signal indicates that high power level is to be used. Depending upon application, more or fewer power source may be used. For example, the processor 209 includes six processor, each corresponds to a data type as listed in Table 1 and couples to a different power source.

The processor 209 is connected to the output buffer 215. The output 215 stores processed data from the processor 209 before the register 217 can send processed data out. For example, the register 217 sends data out in accordance with the clock signal 219.

Figure 3:
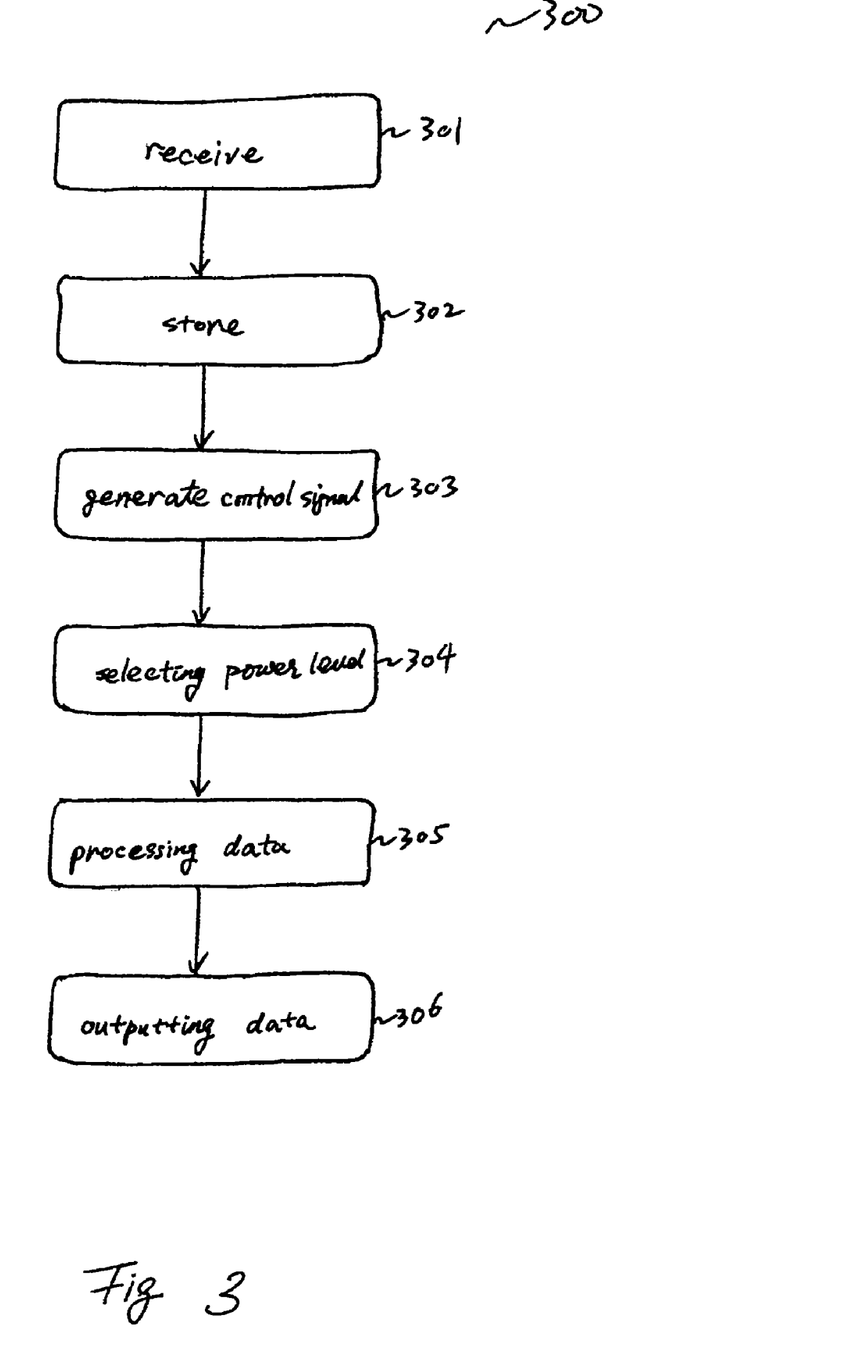
FIG. 3 is a simplified diagram illustrating a method for adjusting power consumption level according to an embodiment of the present invention.

It is to be appreciated that there are various way to implement a power control system for better ASIC device performance according to various embodiments of the present invention. According to an example, various systems can be used to implement a method according to an embodiment of the present invention. FIG. 3 is a simplified diagram illustrating a method for adjusting power consumption level according to an embodiment of the present invention. This diagram is merely an example, which should not unduly limit the scope of the claims. One of ordinary skill in the art would recognize many variations, alternatives, and modifications. Various steps illustrating may be added, removed, replaced, rearranged, repeated, overlapped, or partially overlay. As an example, the method 300 is implement with the system 200.

The system 200 receives data, at step 301. For example, data is received from an external data source. The data is stored, at step 302. According to an embodiment, the data is stored at the input buffer 205. The data stored can be characterized by a first condition. According to an embodiment, the first condition is the fullness of the buffer level at the input buffer. According to another embodiment, the first condition is the data type. According to yet another embodiment, the first condition is a data transfer rate.

The system 200 generates a control signal, at step 303. For example, the control signal is generated by the controller 207. The controller generates the control signal based on the first condition. According to an embodiment, the process of generating control signal includes processing information associated with the first condition and a predetermined condition. For example, if the first condition is higher than the predetermined condition, the control signal represents a first power level. Alternatively, if the first condition is not higher than the predetermined condition, the control signal presents a second power level.

The system 200 selects a power consumption level based on the control signal, at step 304. According to an embodiment, the processor 209 selects a power consumption level based on the control signal. For example, the processor 209 selects a first power consumption level if the control signal represents a first power level. Alternatively, the processor 209 selects a second power consumption level if the control signal represents a second power level. The first power consumption level is higher than the second power consumption level. According to another embodiment, the system 200 averages the data processing power by determining the input buffer behavior.

The system 200 processes the data at the selected power consumption level, at step 305. For example, if the buffer is full, high power consumption is needed to process a large amount of data. It is to be appreciated that by adjusting the voltage level, the system 200 is able to control power consumption, as power consumption is proportional to the square of voltage supply level.

The system outputs the processed data, at step 306. For example, the register 217 outputs processed data in accordance with the clock signal 219.

Figure 5:
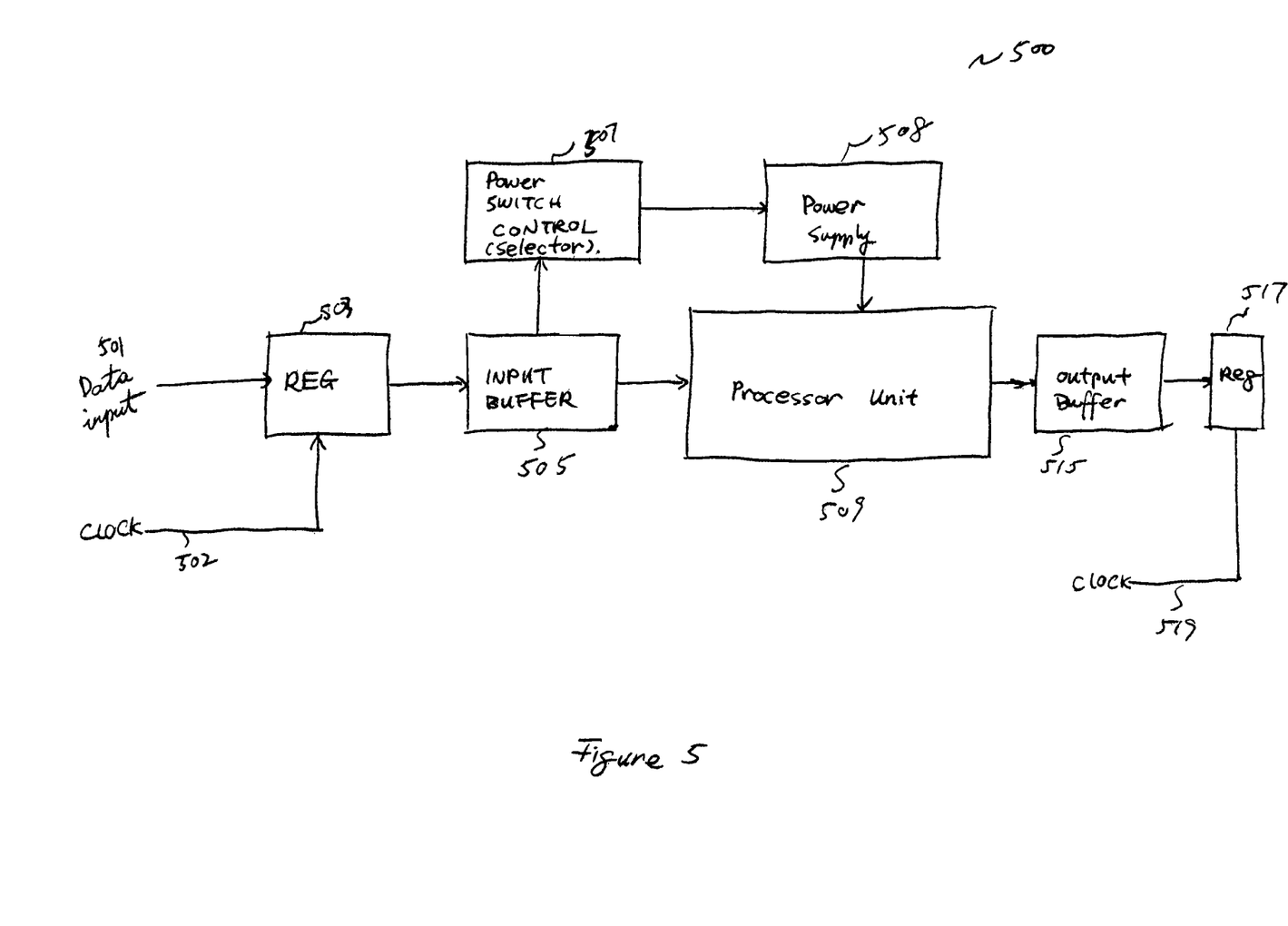
FIG. 5 is a simplified diagram illustrating a power control system for ASIC devices according to an embodiment of the present invention.

FIG. 5 is a simplified diagram illustrating a power control system for ASIC devices according to an embodiment of the present invention. This diagram is merely an example, which should not unduly limit the scope of the claims. One of ordinary skill in the art would recognize many variations, alternatives, and modifications. A system 500 includes, among other things, the following components:

1. data input 501;
2. clock 502;
3. register 503;
4. input buffer 505;
5. controller 507;
6. power supply component 508;
7. processor 509;
8. output buffer 515;
9. register 517; and
10. clock 519.

Although the above has been shown using a selected group of components for the system 500, there can be many alternatives, modifications, and variations. For example, some of the components may be expanded and/or combined. For example, the controller 507 and the power supply component 508 are combined according to an embodiment of the present invention. Other components may be inserted to those noted above. Depending upon the embodiment, the arrangement of components may be interchanged with other replaced. Further details of these components are found throughout the present specification and more particular below.

The register 503 is configured to receive data from the data source 501. According to an embodiment, the register 503 receives data from the data source in accordance with clock input. For example, the clock 502 is a sinusoidal wave with a predetermine frequency and the register 503 receives data segments at the peak of each sinusoidal wave.

The register 503 is connected to the input buffer 505, which is configured to receive from the register 503 and store data. For example, the input buffer 505 includes random access memory (RAM) to store data.

The input buffer 505 is also connected to a controller 507. The controller 507 is configured to perform a variety of functions. According to an embodiment of the present invention, the controller 507 is configured to generate a control signal for the power supply component 509 to indicate a voltage to be supplied to the processor. According to a specific embodiment, the power supply component 509 includes two power sources, each power source operating at a different power level. For example, the controller 507 is able to send a control signal to the power supply component 509 to select a power source to be used. In a specific embodiment, the power level for each of the power sources are predetermined based on optimized power consumption levels. For example, the power level for each of the sources are predetermined based on theoretical calculations and practice experimentations. According to certain embodiments, the power supply component 509 includes three or more power sources.

Depending upon application, the controller 507 determines which of the two power sources to be used based certain criteria. For example, the controller 507 determines the fullness of the input buffer 505. Based on the fullness of the input buffer 505, the controller 507 generate control signal indicating which power source is to be used. For example, the controller 507 generates a signal indicating that the power source with a higher power level is to be used if the input buffer 505 is full. On the other hand, the controller 507 generates a signal indicating that the power source with a lower power level is to be used if the input buffer 505 is empty.

It is to be appreciated that the controller 507, according to certain embodiments of the present invention, offers a flexible solution. For example, the controller 507 is configured to determine power output level based on various conditions. For example, the controller 507 determines the data transfer rates and uses the data transfer rate as a condition for determining the power level output. The controller 507 determines that a power source with high power level is needed when the data transfer rate is higher than a predetermined rate. As another example, the controller 507 determines the type of data that is stored at the input buffer 505. For certain types of data (e.g., multimedia data) that requires more processing power, the controller 507 generates a control signal indicating that a power source with high power level is needed for the purpose of processing data.

Depending upon applications, the controller 507 can be configured to generate control signals for a variety of applications. Optimized power requirement may be stored in a data structure. For example, the controller 207 stores a look up table with optimized power output level as shown in Table 1 above.

According to a specific embodiment, the controller 507 is connected to the processor power supply component 508. The controller 507 is configured to send the control signal to the processor power supply component 508. The processor power supply component 508 selects which power source should be used in response to the control signal received from the controller. According to an embodiment, the processor power supply component 508 includes two or more power sources that are electrically coupled to the processor to provide power. For example, each of the power sources is a circuit that uses a different supply voltage. According to an embodiment, the processor power supply component 508 includes a power source with less than 0.2 volt of power and a power source that is capable of delivering more than 0.5 volt of power. For example, during operation, the processor power supply component 508 selects the power source with lower power level (e.g., below 0.2 volt) to process data if the received control signal indicates that low power level is to be used; the power supply component 508 selects the power source with high power level (e.g., above 0.5 volt) to process data if the received control signal indicates that high power level is to be used. Depending upon application, more or fewer power source may be used. For example, the power supply component 508 includes three or more power sources, each corresponds to a data type as listed in Table 1 and couples to a different power source.

Figure 5A:
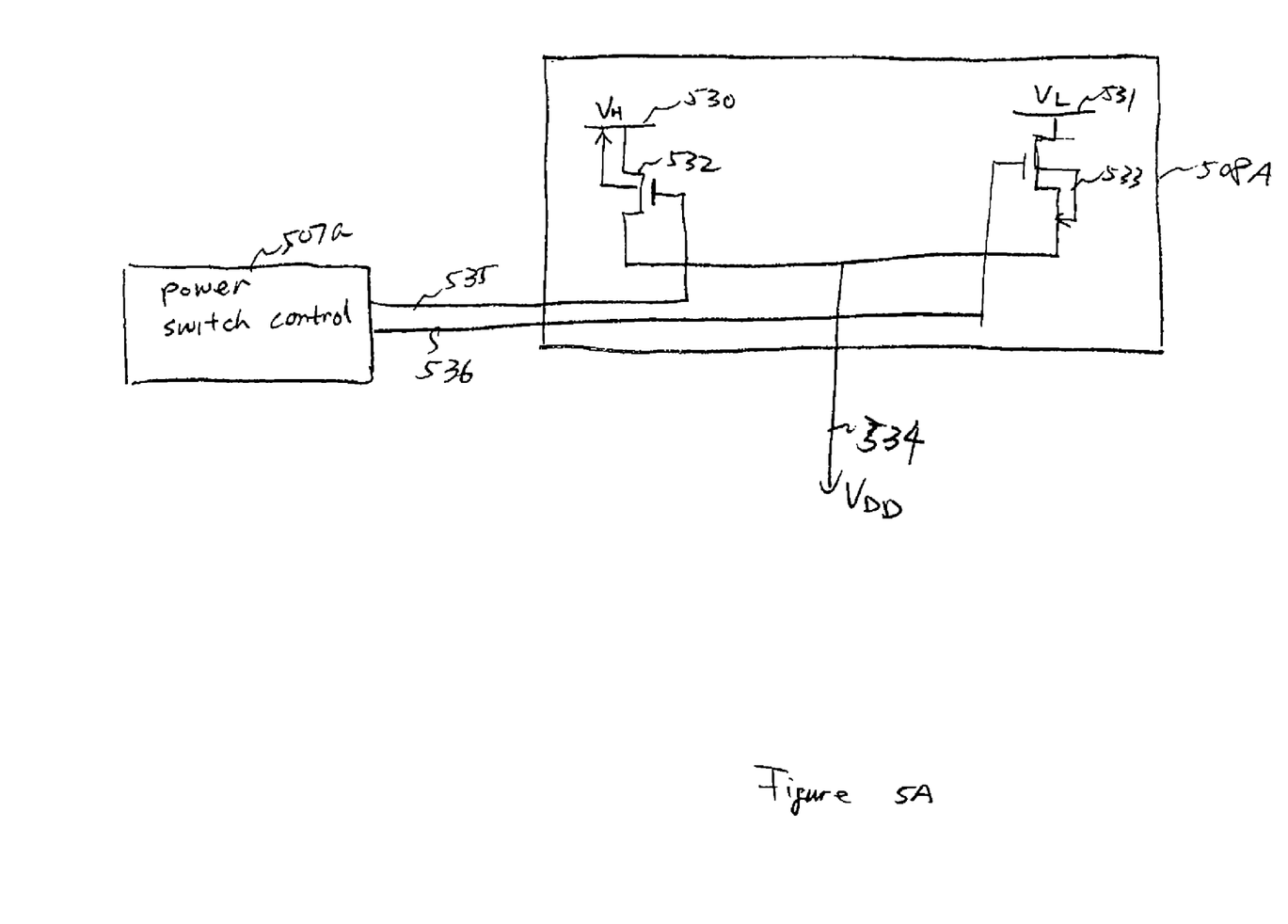

According to a specific embodiment, the power supply component 508 is implemented with power switches as shown in FIG. 5A. FIG. 5A is a simplified diagram illustrating a power supply component according to an embodiment of the present invention. This diagram is merely an example, which should not unduly limit the scope of the claims. One of ordinary skill in the art would recognize many variations, alternatives, and modifications. A power supply component 508a as shown is connected to a power switch control 507a. As an example, the power supply component 508a is the same as the power supply component 508 in FIG. 5, and the power switch control 507a is the same as the power switch control 507 in FIG. 5. The power supply component 508a includes power switches 532 and 533. According to an embodiment and as shown in FIG. 5A, the power switches are implemented with MOSFETs, but it is to be understood that the power switches may be implemented with other devices (e.g., BJT, etc.). The power supply component 508a is coupled to the power switch control 507a. For example, the power switch control 507a provides two connections that are respectively connected to the power switches. According to a specific embodiment, the connection 535 from the power switch control is configured to enable or disable the power switch 532, and the connection 536 from the power switch control is configured to enable or disable the power switch 533. For example, the connections from the power switch control 507a are connected to gate terminals of the power switches, and the voltage carried by the connections 535 and 536 are able to turned on or off the switches. According to the embodiment, when the switch 532 is enabled, a high voltage 530 is supplied by power supply component as the Vdd voltage at terminal 534. When the switch 533 is enabled, a low voltage 531 is supplied by power supply component as the Vdd voltage at terminal 534. Depending upon applications, the high and low voltages may come in from external voltage sources or may be implemented as internal circuitries within the power supply component 508a.

Now referring back to FIG. 5. The processor 509 is connected to the output buffer 215. The output 515 stores processed data from the processor 509 before the register 517 can send processed data out. For example, the register 517 sends data out in accordance with the clock signal 519.

Figure 6:
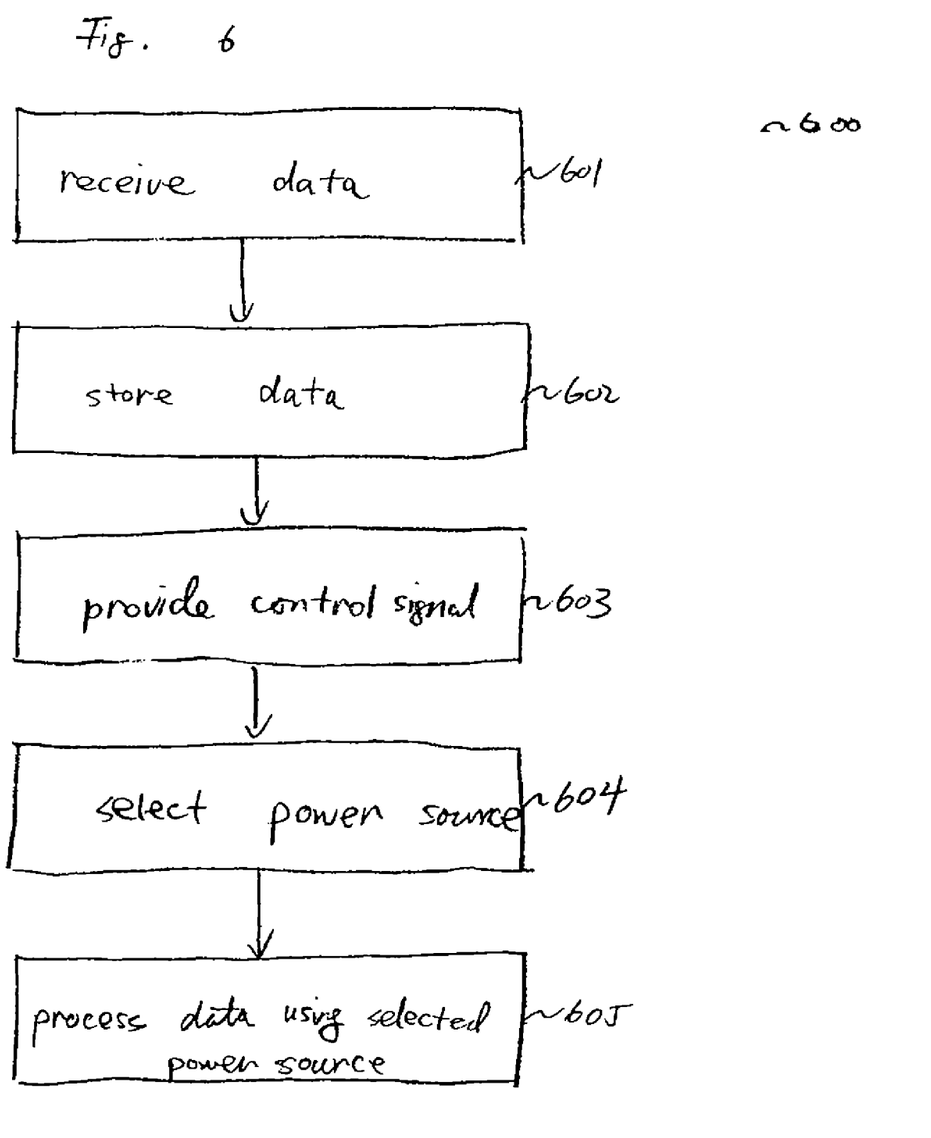
FIG. 6 is a simplified diagram illustrating a method for adjusting power consumption level for an ASIC device according to an embodiment of the present invention.

It is to be appreciated that there are various way to implement a power control system for better ASIC device performance according to various embodiments of the present invention. According to an example, various systems can be used to implement a method according to an embodiment of the present invention. FIG. 6 is a simplified diagram illustrating a method for adjusting power consumption level for an ASIC device according to an embodiment of the present invention. This diagram is merely an example, which should not unduly limit the scope of the claims. One of ordinary skill in the art would recognize many variations, alternatives, and modifications. Various steps illustrating may be added, removed, replaced, rearranged, repeated, overlapped, or partially overlay. As an example, the method 600 is implement with the system 500.

The system 500 receives data, at step 601. For example, data is received from an external data source. The data is stored, at step 602. According to an embodiment, the data is stored at the input buffer 505. The data stored can be characterized by a first condition. According to an embodiment, the first condition is the fullness of the buffer level at the input buffer. According to another embodiment, the first condition is the data type. According to yet another embodiment, the first condition is a data transfer rate.

The system 500 generates a control signal, at step 603. For example, the control signal is generated by the controller 207. The controller generates the control signal based on the first condition. According to an embodiment, the process of generating control signal includes processing information associated with the first condition and a predetermined condition. For example, if the first condition is higher than the predetermined condition, the control signal represents a first power level. Alternatively, if the first condition is not higher than the predetermined condition, the control signal presents a second power level.

The system 500 selects a power consumption level based on the control signal, at step 604. According to an embodiment, the power supply component 508 selects a power consumption level based on the control signal. For example, the power supply component 508 selects the power source if the control signal represents a first power level. Alternatively, the power supply component 508 selects a second power consumption level if the control signal represents a second power level. The first power consumption level is higher than the second power consumption level. According to another embodiment, the system 500 averages the data processing power by determining the input buffer behavior.

The system 500 processes the data using the selected power source, at step 605. For example, if the buffer is full, high power consumption is needed to process a large amount of data. It is to be appreciated that by adjusting the voltage level, the system 500 is able to control power consumption, as power consumption is proportional to the square of voltage supply level.

The system outputs the processed data, at step 606. For example, the register 617 outputs processed data in accordance with the clock signal 619.

According to an embodiment, the present invention provides a system for adjusting power consumption of an application specific integrated circuit (ASIC) device. The system includes a first buffer that is configured to receive and store data. For example, the first buffer can be characterized by a first buffer level. The method also includes a controller configured to generate a control signal. According to an embodiment, the controller is coupled to the first buffer. The system additionally includes a power supply component, which is configured to receive the control signal and to provide at least at a first voltage and a second voltage. For example, the first voltage and the second voltage are different. The system further includes a processing unit coupled to the first buffer, the processing unit further being configured to receive the data from the first buffer and to process the data, the processing unit being electrically coupled to the power supply component, the processing unit being capable of operating at the first voltage and the second voltage. In addition, the system includes a second buffer that is coupled to the processing unit. In an embodiment, the second buffer is configured to receive and store the processed data. The controller is further configured to process information associated at least with the first buffer level and a first predetermined buffer level. If the first buffer level is determined to be higher than the first predetermined buffer level, the control signal indicates that the first voltage to be provided by the power supply component. If the first buffer level is determined to be not higher than a first predetermined buffer level, the control signal indicates that the second voltage is to be provided by the power supply component. The power supply component provides an output supply voltage based on the control signal, the output supply voltage being either the first voltage or the second voltage. For example, the embodiment is illustrated according to FIG. 5.

According to another embodiment, the present invention provides a method for adjusting power consumption of an ASIC device. The method includes a step for receiving and storing data at a first buffer, which can be characterized by a first condition (e.g., buffer fullness, data rate, etc.). The method also includes a step for generating a control signal that is associated with the first condition. The method additionally includes a step for selecting a voltage source based on the control signal. For example, the voltage source is associated with a predetermined voltage level. Furthermore, the method includes a step for processing the data at the predetermined voltage level. The method additionally includes a step for outputting the processed data. The generating a control signal further comprises processing information associated with the first condition and a predetermined condition. If the first condition is determined to be higher than the predetermined condition, the control signal indicates that the voltage source to be a first voltage source. If the first condition is determined to be not higher than the predetermined condition, the control signal indicates the voltage source to be a second voltage source. The first voltage source operates at a first voltage level, the second voltage source operates at a second voltage level. For example, the first voltage level is higher than the second voltage level. For example, the embodiment is illustrated according to FIG. 6.

According to yet another embodiment, the present invention provides a system for adjusting power consumption of an ASIC device. The system includes a first buffer component that is configured to receive and store data. Among other things, the first buffer can be characterized by a first condition. The system also includes a controller that is configured to generate a control signal. The first control is coupled to the first buffer. The system further includes a power supply component that is configured to receive the control signal from the controller. The power supply component includes a first power source and a second power source. For example, the first voltage source is configured to provide power at a first power level. The second voltage source is configured to provide power at a second power level. The system additionally includes a processing unit that is configured to process the data stored at the first buffer component. The processing unit is electrically coupled to the power supply component. For example, the processing unit is capable of operating at the first power level and the second power level. The system further includes a second buffer being coupled to the processing unit. The second buffer is configured to receive and store the processed data from the processing unit. The controller is further configured to process information associated at least with the first condition, a first predetermine condition, and a second predetermined condition. If the first condition is determined to satisfy the first predetermined condition, the control signal indicates that the first power source is to be used. If the second condition is determined to satisfy the second predetermined condition, the control signal indicates that the first power source is to be used. The power supply component is further configured to supply power using the first power source if the control signal indicates that the first power source is to be used, and to operate with the second power source if the control signal indicates that the second power source is to be used. The first power source is associated with a first power consumption level. The second power source is associated with a second power consumption level, the second power consumption level being different from the first power consumption level. The first predetermined condition is different from the second predetermined condition. For example, the embodiment is illustrated according to FIG. 5.

Figure 4:
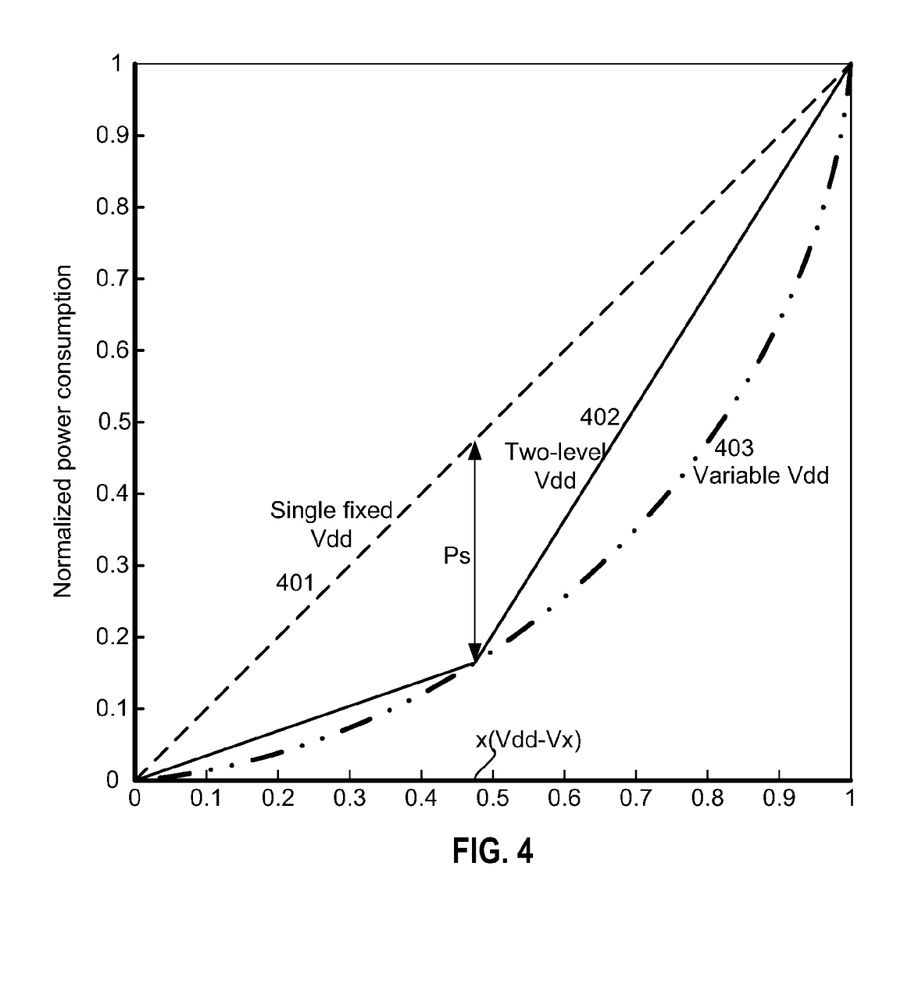
FIG. 4 is a simplified diagram illustrating the power consumption of an embodiment of the present invention.

It is to be appreciated that the present invention provides an improved system and method for providing power for ASIC devices. According to certain embodiments, the present invention reduces power consumption and improves power efficiency for ASIC devices. Depending upon application, the present lowers power consumption and prolongs battery usage for portable devices that utilize ASIC devices. For certain applications, the present invention lowers heat dissipation by adjusting power used by ASIC devices. For example, low power is used when ASIC devices is not busy. Certain embodiments of the present invention utilize a controller to provide control signal for adjusting the operation power of ASIC devices. To illustrate the improvement offered by the present invention, FIG. 4 is shown. FIG. 4 is a simplified diagram illustrating the power consumption of an embodiment of the present invention. This diagram is merely an example, which should not unduly limit the scope of the claims. One of ordinary skill in the art would recognize many variations, alternatives, and modifications.

As shown in FIG. 4, curve 402 illustrating power consumption level of an embodiment according to the present invention utilizes less power than a convention system as illustrated depicted by curve 401. The graph depicts the normalized power consumption levels versus data rate, which is based on average data rate for three different scenarios. The curve 401 illustrates the power consumption for a fixed Vdd (single power supply). The curve 402 illustrates the reduced power consumption for an embodiment of the present invention utilizing two power sources. The curve 403 illustrates variable Vdd for an ideal DC-DC converter.

Depending upon application, the present invention also provides better flexibility for power control and implementation. For example, more power levels can be implemented to save more dynamic energy. However, circuit area becomes bigger as more power levels are implemented. It is therefore important to note that two-level power supply system can reduce dynamic power consumption It is understood the examples and embodiments described herein are for illustrative purposes only and that various modifications or changes in light thereof will be suggested to persons skilled in the art and are to be included within the spirit and purview of this application and scope of the appended claims.

What is claimed is:

1. A system for adjusting power consumption of an application specific integrated circuit (ASIC) device, the system comprising:
    a first buffer, the first buffer being configured to receive and store data, the first buffer being characterized by a first buffer level;
    a controller configured to generate a control signal, the controller being coupled to the first buffer;
    a power supply component, the power supply component being configured to receive the control signal and to provide at least at a first voltage and a second voltage, the first voltage and the second voltage being different;
    a processing unit directly coupled to the first buffer, the processing unit further being configured to receive the data from the first buffer and to process the data, the processing unit being electrically coupled to the power supply component, the processing unit being capable of operating at the first voltage and the second voltage;
    a second buffer directly coupled to the processing unit, the second buffer being configured to receive and store the processed data;
    wherein:
        the controller is further configured to process information associated at least with the first buffer level and a first predetermined buffer level;
        if the first buffer level is determined to be higher than the first predetermined buffer level, the control signal indicates that the first voltage to be provided by the power supply component;
        if the first buffer level is determined to be not higher than the first predetermined buffer level, the control signal indicates that the second voltage is to be provided by the power supply component;
        the power supply component provides an output supply voltage based on the control signal, the output supply voltage being either the first voltage or the second voltage.

2. The system of claim 1 wherein the power supply component is electrically coupled to a first voltage source and a second voltage source, the power supply component being configured to enable the first voltage source using a first switch and to enable the second voltage source using a second switch.

3. The system of claim 2 wherein the first switch and the second switch are metal oxide semiconductor field effect transistors (MOSFET).

4. The system of claim 2 wherein the first switch and the second switch are p-type MOSFETs.

5. The system of claim 1 wherein the first voltage is greater than 0.6 volt.

6. The system of claim 1 wherein the power supply component includes a first voltage source and a second voltage source, the first voltage source being configured to provide the first voltage, the second voltage source being configured to provide the second voltage.

7. The system of claim 1 wherein the first voltage is higher than the second voltage.

8. The system of claim 1 wherein the first voltage is characterized as a direct current voltage.

9. The system of claim 1 further comprises a clock, the clock being configured to generate a clock signal.

10. A method for adjusting power consumption of an ASIC device, the method comprising:
    receiving and storing data at a first buffer, the first buffer being characterized by a first condition;
    generating a control signal, the control signal being associated with the first condition;
    selecting a voltage source based on the control signal, the voltage source being associated with a predetermined voltage level;
    processing the data at the predetermined voltage level;
    outputting the processed data;
    wherein:
        the generating a control signal further comprises processing information associated with the first condition and a predetermined condition;
        if the first condition is determined to be higher than the predetermined condition, the control signal indicates that the voltage source to be a first voltage source;
        if the first condition is determined to be not higher than the predetermined condition, the control signal indicates the voltage source to be a second voltage source;
        the first voltage source operates at a first voltage level, the second voltage source operates at a second voltage level, the first voltage level being higher than the second voltage level,
        the first condition includes a size of data stored;
        the processing the data includes directly coupling a processing unit to the first buffer.

11. The method of claim 10 further comprising synchronizing processed data.

12. The method of claim 10 further comprising determining an averaging workload.

13. The method of claim 10 wherein the first condition includes a type of data stored.

14. The method of claim 10 wherein the first condition includes a rate of data to be processed.

15. A system for adjusting power consumption of an ASIC device, the system comprising:
    a first buffer component, the first buffer component being configured to receive and store data, the first buffer being characterized by a first condition;
    a controller being configured to generate a control signal, the controller being coupled to the first buffer;
    a power supply component being configured to receive the control signal from the controller, the power supply component including a first power source and a second power source, the first voltage source being configured to provide power at a first power level, the second voltage source being configured to provide power at a second power level;
    a processing unit directly coupled to the first buffer component and being configured to process the data stored at the first buffer component, the processing unit being electrically coupled to the power supply component, the processing unit being capable of operating at the first power level and the second power level; and
    a second buffer directly coupled to the processing unit, the second buffer being configured to receive and store the processed data from the processing unit;

wherein:
the controller is further configured to process information associated at least with the first condition, a first predetermined condition, and a second predetermined condition;
if the first condition is determined to satisfy the first predetermined condition, the control signal indicates that the first power source is to be used;
if the second condition is determined to satisfy the second predetermined condition, the control signal indicates that the first power source is to be used;
the power supply component is further configured to supply power using the first power source if the control signal indicates that the first power source is to be used, and to operate with the second power source if the control signal indicates that the second power source is to be used;
the first power source is associated with a first power consumption level;
the second power source is associated with a second power consumption level, the second power consumption level being different from the first power consumption level;
the first predetermined condition is different from the second predetermined condition.

16. The system of claim 15 wherein the first condition includes a data type.

17. The system of claim 15 wherein the first condition includes a data transfer rate.

18. The system of claim 15 wherein the first condition includes a buffer level.

19. The system of claim 18 wherein the buffer level is determined by the controller.

20. The system of claim 17 wherein the data transfer rate is determined by the controller.

21. The system of claim 15 wherein the first power source is optimized for processing burst data.

22. The system of claim 15 wherein the second power source is optimized for processing uniform data.

23. A system for adjusting power consumption of an application specific integrated circuit (ASIC) device, the system comprising:
a first buffer, the first buffer being configured to receive and store data, the first buffer being characterized by a first buffer level;
a controller configured to generate a first control signal and a second control signal, the controller being coupled to the first buffer;
a power supply component including a first switch and a second switch, the power supply component being configured to receive the first and second control signals, the first switch being configured to enable a first voltage in response to receiving the first control signal, the second switch being configured to enable a second voltage in response to receiving a second control signal, the first voltage and the second voltage being different;
a processing unit directly coupled to the first buffer, the processing unit further being configured to receive the data from the first buffer and to process the data, the processing unit being electrically coupled to the power supply component, the processing unit being capable of operating at the first voltage and the second voltage;
a second buffer directly coupled to the processing unit, the second buffer being configured to receive and store the processed data;
wherein:
the controller is further configured to process information associated at least with the first buffer level and a first predetermined buffer level;
if the first buffer level is determined to be higher than the first predetermined buffer level, the controller send the first control signal;
if the first buffer level is determined to be not higher than a first predetermined buffer level, the controller sends the second control signal;
the power supply component provides an output supply voltage based on which of the first and the second control signals is received, the output supply voltage being either the first voltage or the second voltage.

* * * * *